United States Patent [19]

Yamashita et al.

[11] Patent Number: 5,082,096
[45] Date of Patent: Jan. 21, 1992

[54] CONTROL APPARATUS FOR AN AUTOMATIC CLUTCH DEVICE

[75] Inventors: Yoshinori Yamashita, Shizuoka; Hiroaki Yamamoto, Himeji, both of Japan

[73] Assignees: Mitsubishi Denki K. K., Tokyo; Suzuki Motor Corporation, Shizuoka, both of Japan

[21] Appl. No.: 592,738

[22] Filed: Oct. 4, 1990

[30] Foreign Application Priority Data

Oct. 5, 1989 [JP] Japan .................................. 1-260654

[51] Int. Cl.$^5$ ............................................. B60K 41/02
[52] U.S. Cl. .............................. 192/0.032; 192/0.076; 192/3.58; 192/103 F; 364/424.1
[58] Field of Search .............. 192/0.032, 0.033, 0.076, 192/0.092, 0.096, 3.58, 85 R, 103 R, 103 F; 364/424.1

[56] References Cited

U.S. PATENT DOCUMENTS

| 4,648,496 | 3/1987 | Petzold et al. | 192/0.076 |
| 4,856,380 | 8/1989 | Nurano et al. | 364/424.1 X |

FOREIGN PATENT DOCUMENTS

| 1-44338 | 2/1989 | Japan | 192/0.076 |
| 1-44341 | 2/1989 | Japan | 192/0.076 |
| 1-44343 | 2/1989 | Japan | 192/0.076 |
| 1-119431 | 5/1989 | Japan | 192/3.58 |
| 1-153349 | 6/1989 | Japan | 192/85 R |

Primary Examiner—Richard Lorence
Attorney, Agent, or Firm—Sughrue, Mion, Zinn Macpeak & Seas

[57] ABSTRACT

A control apparatus for an automatic clutch device which comprises a primary pressure controlling valve for controlling a primary pressure in an oil clutch, a line pressure controlling valve for controlling a line pressure in the oil clutch, a clutch pressure controlling valve for controlling a clutch pressure in the oil clutch, first, second and third electromagnetic valves for controlling respectively the primary pressure controlling valve, the line pressure controlling valve and the clutch pressure controlling valve, and a control section which controls the first, second and third electromagnetic valves and effects a feed-back control of engine speed to the third electromagnetic valve, and which stores values obtained by the learning of feedback quantities of the engine speed until the last time and changes a clutch pressure control duty to the third electromagnetic valve by modifying a feed forward quantity with the value by learning.

3 Claims, 7 Drawing Sheets

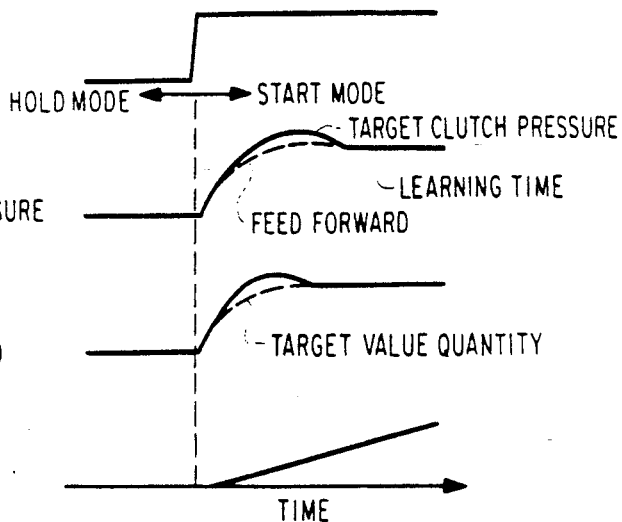
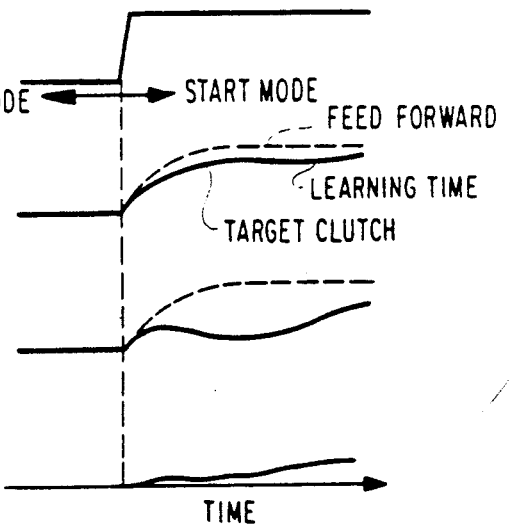

FIGURE 4 PRIOR ART
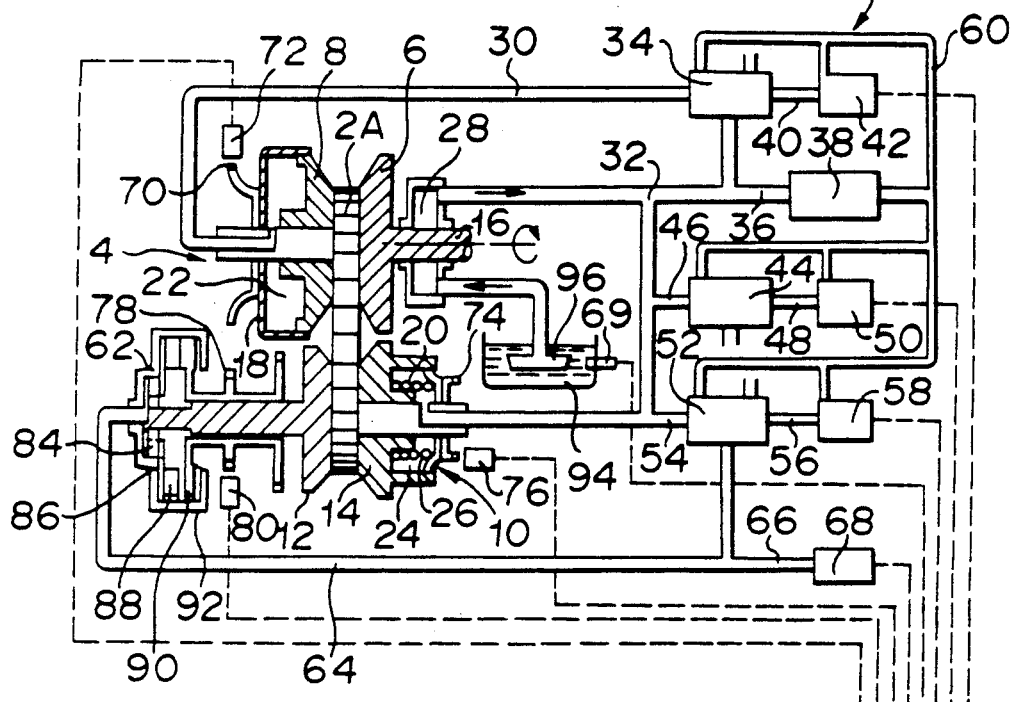
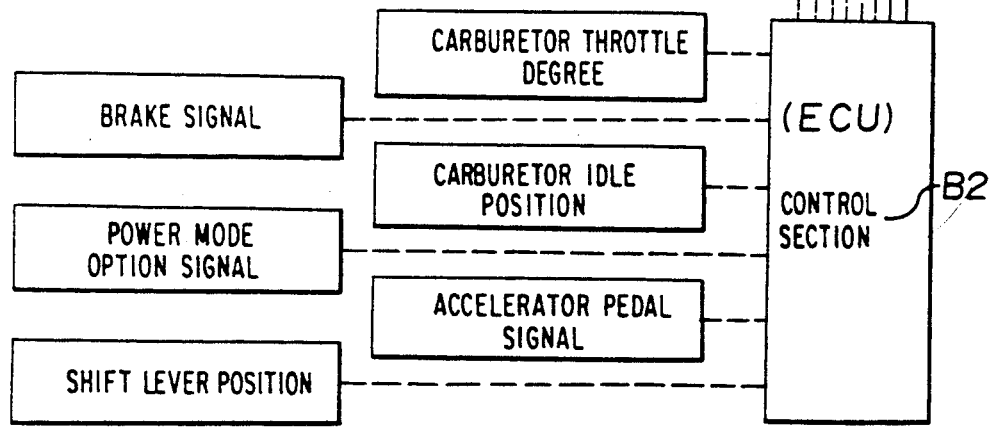

FIGURE 9 *PRIOR ART*
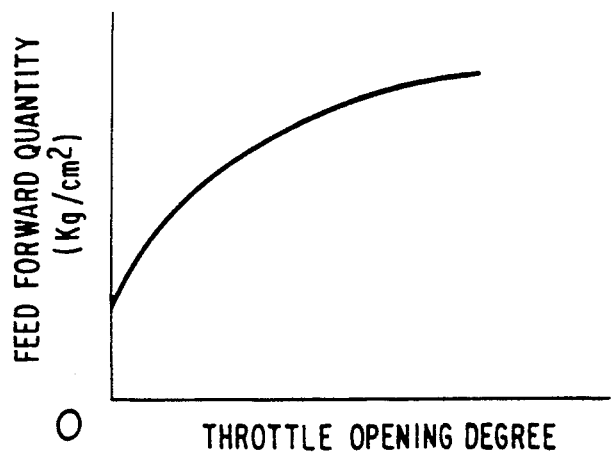

CONTROL APPARATUS FOR AN AUTOMATIC CLUTCH DEVICE

BACKGROUND OF THE INVENTION

1. Field of the Invention

The present invention relates to a control apparatus for an automatic clutch device which assures stable operations of the automatic clutch device even when there is a change of the output of the engine of an automobile and a change in characteristics of the engine due to the aging of the structural elements.

2. Discussion of Background

FIG. 4 is a block diagram showing a conventional belt-driven type speed changing machine. In FIG. 4, a reference numeral 2 designates a speed changing machine and a numeral 2A designates a belt.

The belt 2A is extended between a driving side fixed pulley member 6 and a driven side fixed pulley member 12. A driving side pulley assembly 4 is mainly composed of the driving side fixed pulley member 6 and a driving side movable pulley member 8.

A driven side pulley assembly 10 is mainly composed of the driven side fixed pulley member 12 and a driven side movable pulley member 14.

The driving side fixed pulley member 6 of the driving side pulley assembly 4 is fixed to a rotary shaft 16. The driving side movable pulley member 8 is mounted on the rotary shaft 16 so as to be capable of moving in the axial direction of the shaft 16, but to be incapable of rotating.

The driving side movable pulley member 8 and the driven side movable pulley member 14 are respectively provided with first and second housings 18, 20 so that first and second oil chambers 22, 24 are respectively formed by the first and second housings.

A pushing means 26 such as a spring is provided in the second oil chamber 24 so as to push the second housing 20 in the direction of expanding the second oil chamber 24.

An oil pump 28 is provided on the rotary shaft 16. The oil pump 28 is communicated with the first and second oil chambers 22, 24 through first and second oil conduits 30, 32 respectively.

A primary pressure control valve 34 is provided in the first oil conduit 30. The primary pressure control valve 34 is a speed changing control valve for controlling a primary pressure known as an input shaft sheave pressure.

A constant pressure control valve 38 for controlling the line pressure (generally 5–25 kg cm$^2$) to be a constant pressure (3–4 kg/cm$^2$) is connected through a third oil conduit 36 to the first oil conduit 30 which is at the side of the oil pump 28 with respect to the primary pressure control valve 34. The primary pressure control valve 34 is also communicated with a first threeway electromagnetic valve 42 for controlling primary pressure through a fourth oil conduit 40.

An intermediate of the second oil conduit 32 is connected to an intermediate of a seventh oil conduit 54 through a fifth oil conduit 46, and the fifth oil conduit 46 is connected to a sixth oil conduit 48 through a line pressure control valve 44 which has a pressure releasing function so as to adjust the line pressure. The line pressure control valve 44 is communicated with a second three-way electromagnetic valve 50 for controlling the line pressure through the sixth oil conduit 48.

The seventh oil conduit 54 is communicated with an eighth oil conduit 56 through a clutch pressure control valve 52 for controlling a clutch pressure. The eighth oil conduit 56 is communicated with a third three-way electromagnetic valve 58 for controlling a clutch pressure.

The first three-way electromagnetic valve 42 for controlling clutch pressure, the second three-way electromagnetic valve 50 for controlling clutch pressure and the third three-way electromagnetic valve 58 for controlling clutch pressure are respectively connected to a ninth oil conduit 60, and they are respectively communicated with the primary pressure control valve 34, the line pressure control valve 44 and the clutch pressure control valve 52. An end of the seventh oil conduit 54 is communicated with the second oil chamber 24.

The clutch pressure control valve 52 is communicated with an oil clutch 62 through a tenth oil conduit 64 and is communicated with a pressure sensor 68 through a eleventh oil conduit 66. The pressure sensor 68 detects an oil pressure in the oil clutch 62 wherein the detected oil pressure can be used for a target clutch pressure when the clutch pressure is controlled in a hold mode or a start mode.

In a drive mode, the clutch pressure becomes equal to the line pressure. Accordingly, the detection of the clutch pressure contributes for the control of the line pressure.

An input shaft revolution detecting gear wheel 70 is provided at the outside of the first housing 18, and a first revolution detecting device 72 placed at the side of an input shaft is provided near the outer circumference of the input shaft revolution detecting gear wheel 70. On the other hand, an output shaft revolution detecting gear wheel 74 is provided at the outside of the second housing 20, and a second revolution detecting device 76 placed at the side of an output shaft is provided near the outer circumference of the output shaft revolution detecting gear wheel 74.

Detection signals from the first and second revolution detecting devices 72, 76 are transmitted to a control section (ECU) 82, whereby a revolution speed of engine and a belt ratio are obtainable.

The oil clutch 62 is provided with an output transmitting gear wheel 78, and a third revolution detecting device 80 is provided near the outer circumference of the output transmitting gear wheel 78 to detect the revolution of the output shaft of the final stage. The third revolution detecting device 80 detects the revolutions of a reduction gear device and a differential gear, a driving mechanism and the final output shaft directly connected to a tire, by which a car speed can be detected. Further, it is possible to detect the revolutions before and after the oil clutch 62 by the cooperation of the second and third revolution devices 76, 80, which contributes the detection of a quantity of slip in the clutch.

The control section 82 receives a signal of a throttle opening degree in a carburetor (not shown) and various signals concerning revolution speed of the engine, car speed or the like to thereby change the duty ratio, hence, speed change control can be effected. The control section 82 controls the opening and closing operations of the first three-way electromagnetic valve 42, the constant pressure control valve 38, the second and third three-way electromagnetic valves 50, 58 and the pressure sensor 68.

Signals inputted to the control section 82 and the function of the input signals are as follows.

(1) Signals to detect the position of a shift lever

Signals indicating each range of "P", "R", "N", "D" or "L" which are used for controlling the line pressure required for each of the ranges, duty ratios and the oil clutch.

(2) Signals indicating degrees of opening of a throttle valve in a carburetor

The signals are used for detecting engine torques from memories previously inputted in a program and determining a target engine revolution or a target duty ratio.

(3) Signals for detecting idling positions in the carburetor

The signals are used for correcting a carburetor throttle opening degree sensor and for increasing accuracy in the control.

(4) Signals concerning an accelerator pedal

The signals are used for detecting the intention of a driver on the basis of a state of depression of an accelerator pedal and for determining optimal control at the time of cruising or starting.

(5) Signals of a brake

The signals are used for detecting the presence or absence of the depressing of a brake pedal and for determining optimal control for the separation of the clutch.

(6) Signals concerning options such as power mode

The signals are used for options such as changing the performance of an automobile into, for instance, sports car feeling (or economical use).

The control section 82 is to receive a detection signal on car speed NCO, and to switch a speed-change control system from an open-loop control to a closed loop control even in a normal start mode when the car speed NCO exceeds a predetermined value such as a car speed trigger value NCOTR.

A numeral 84 designates a piston disposed in the oil clutch 62, a numeral 86 designates a ring-like spring, a numeral 88 designates a first pressure plate, a numeral 90 designates a friction plate, a numeral 92 designates a second pressure plate, a numeral 94 designates an oil pan, a numeral 96 designates an oil filter, and a numeral 69 designates an oil temperature sensor for detecting the temperature of pressure oil so that the output of the oil temperature sensor is outputted to the control section 82.

The operation of the conventional control apparatus will be described.

In the belt-driven type continuous speed changing machine 2, the oil pump 28 mounted on the rotary shaft 16 is operated in response to the actuation of the rotary shaft 16, and oil in the oil pump 28 is supplied from the oil pan 94 located at the bottom of the speed changing machine through the oil filter 96.

A pressure by the oil pump 28, i.e. a line pressure is controlled by the line pressure control valve 44. Namely, when an amount of leakage in the line pressure control valve 44, i.e. a quantity of oil released from the line pressure control valve 44 is large, the line pressure becomes low. On the contrary, when the quantity is small, the line pressure becomes high.

The line pressure control valve 44 has speed control characteristics wherein the line pressure is changed in three stages: a full low state, a full overtop state and a ratio fixing state. The operation of the line pressure control valve 44 is controlled inclusively by the second three-way electromagnetic valve, and the line pressure control valve 44 is actuated in response to the operation of the second three-way electromagnetic valve 50.

The second three-way electromagnetic valve 50 is controlled with a duty ratio at a constant frequency. Namely, a state of duty ratio being 0% is a state that the second three-way electromagnetic valve 50 is not operated at all wherein the output side is communicated with the atmosphere and the output oil pressure is zero. A state of duty ratio being 100% means a state that the second three-way electromagnetic valve 50 is actuated so that the output side is isolated from the atmosphere and the pressure of the electromagnetic valve 50 becomes the same as a controlling pressure, i.e. the maximum output oil pressure. The oil pressure is changed by the duty ratio. Accordingly, the characteristic of the second three-way electromagnetic valve 50 is substantially linear and it is possible to operate the line pressure control valve 44 in an analogous fashion, whereby the duty ratio of the second three-way electromagnetic valve 50 is changed desirably to thereby control the line pressure.

The second three-way electromagnetic valve 50 is controlled by the control section 82. The primary pressure used for speed changing is controlled by the primary pressure control valve 34, which is controlled inclusively by the first three-way electromagnetic valve 42 in the same manner as the line pressure control valve 44.

The first three-way electromagnetic valve 42 is used for communicating the primary pressure with the line pressure, or for communicating the primary pressure with the atmospheric pressure. Further, it functions to shift the belt ratio to the full over drive state by communicating the primary pressure with the line pressure, or to shift to the full low state by communicating the primary pressure with the atmospheric pressure.

On the other hand, the clutch pressure control valve 52 controls the clutch pressure, and when the maximum clutch pressure is needed, it communicates the system with the line pressure side, and when the lowest clutch pressure is needed, it communicates the system with the atmospheric pressure side.

The clutch pressure control valve 52 is controlled inclusively by the third three-way electromagnetic valve 58 in the same manner as the line pressure control valve 44 and the primary pressure control valve 34, and therefore description will be omitted.

The clutch pressure is changed in a range from the lowest atmospheric pressure (zero) to the maximum line pressure. For the control of the clutch pressure, there are four basic patterns. The basic patterns are as follows.

(1) Neutral mode

The position of a shift lever corresponds to "N" or "P" wherein the clutch is in a completely separate state, and the clutch pressure shows the lowest pressure (zero).

(2) Hold mode

The position of the shift lever corresponds to "D", "L" or "R" which is in a low pressure level in a case that, for instance, a driver doesn't intend to drive without operating a throttle lever, or he decelerates the speed during cruising by separating the engine torque. In this case, the clutch is not entirely in contact with the engine torque, but rather is barely in contact therewith.

(3) Start mode

This corresponds to a state that the automobile is about to start or the clutch is again connected after the brakings of the clutch. In this state, the clutch pressure is at a suitable level so as not to cause the engine to malfunction and to produce an appropriate engine torque (clutch input torque) so that the automobile can be operated smoothly.

(4) Drive mode

The automobile is in a normal cruising state and the clutch is completely coupled. The clutch pressure is kept at a high level so as to be sufficiently durable to a high engine torque.

The neutral mode (1) among the basic patterns is effected by a switching valve (not shown) operable in association with shifting operations, and other basic patterns (2), (3) and (4) are-effected by the duty ratio control of the first through third three-way electromagnetic valves 42, 50, 58 by the control section 82. Especially, in the drive mode (4), the seventh oil conduit 54 is communicated with the tenth oil conduit 64 by means of the clutch control valve 52 to thereby produce the maximum pressure, whereby the clutch pressure becomes the same as the line pressure.

The primary pressure control valve 34, the line pressure control valve 44 and the clutch pressure control valve 52 are respectively controlled by output oil pressures from the first through third three-way electromagnetic valves 42, 50, 58. An oil pressure to control the first through third electromagnetic valves 42, 50, 58 is a constant oil pressure which is produced at a constant pressure control valve 38. The control oil pressure is lower than the line pressure, however, it provides a stable constant pressure. Further, the control oil pressure assures stable operations of the primary pressure control valve 34, the line pressure control valve 44 and the clutch pressure control valve 52.

In the following, description will be made as to electronically controlling the conventional belt-driven type continuous speed changing machine 2. The operation of the belt-driven type continuous speed changing machine 2 is controlled by oil pressure, wherein a belt holding function, a line pressure for-suitably transmitting a torque, a primary pressure used for changing a speed change ratio and a clutch pressure for certainly coupling the clutch are respectively given on the basis of instructions from the control section 82.

FIG. 5 is a block diagram showing the internal construction of the control section 82 which has a feed back system and a feed forward system. In FIG. 5, the control duty for speed change is 0% in the start mode. In controlling the line pressure, a target line pressure is determined in a target line pressure determining means 111 depending on a throttle opening degree $\theta$, and the output of the target line pressure determining means 111 is supplied to a first order lag filter 112 at which the target line pressure valve is subjected to a first order lag. The output of the first order lag filter 112 is supplied to a pressure/duty converting means 113 at which a duty corresponding to the target pressure value determined and a line pressure control duty is outputted. The above-mentioned is a brief description concerning the feed back control system on engine speed.

In the next, description will be made as to a clutch pressure control duty in the feed forward control system. In controlling the clutch pressure, a target engine speed is determined in a target engine speed determining means 103 depending on a throttle opening degree $\theta$; the signal of the target engine speed determining means 103 is passed through a first order lag filter 104 at which a first order lag filtering treatment is conducted, and the output of the first order lag filter 104 is supplied to a subtractor 105. In the subtractor 105, a subtracting operation of the output of the first order lag filter 104 and an actual engine speed Ne is conducted to obtain an error, which is supplied to a PI control means 106. The PI control means 106 receives the output of the subtractor 105, i.e. the error between the target engine speed and the actual engine speed Ne and carries out proportion and integration calculations. As a result of the calculations, an output from the PI control means 106 is supplied as a target pressure correcting value to a subtractor 107.

On the other hand, in a feed forward loop, a temporary target clutch pressure is determined in a feed forward quantity determining means 101 depending on a throttle opening degree $\theta$, and the temporary target clutch pressure value is subjected to a first order lag filtering treatment in a first order lag filter 102, whereby the output of the filter 102 is supplied to the subtractor 107. The subtractor 107 conducts subtracting calculations of the temporary target clutch pressure from the target pressure correcting value so that the temporary target clutch pressure is corrected by the target pressure correcting value, and the corrected value is outputted as a new target clutch pressure to a subtractor 108. The subtractor 108 subtracts the target clutch pressure value from an actual clutch pressure Pc to obtain an error, and the error is outputted to a PID control means 109.

The PID control means 109 conducts calculations of proportion, differentiation and integration, and a result of the calculations is outputted to a subtractor 110. The subtractor 110 subtracts the output of the PID control means 109 from an offset duty value to obtain an error as a clutch pressure control duty which is treated as a manipulated variable.

FIG. 6 is a diagram showing a relation of throttle opening degree to target engine speed in the target engine speed determining means 103.

The feed forward quantity determining means 101 operates and outputs a clutch pressure capable of transmitting an engine torque, which corresponds to a target engine speed which is determined by a throttle opening degree $\theta$.

FIG. 8 is a diagram prepared by adding target engine speed curves to an engine characteristic diagram, by which a target engine speed corresponding to a throttle opening degree and a nominal engine torque Ten corresponding to the target engine speed are obtainable.

In the feed forward quantity determining means 101, a feed forward quantity can be obtained from the following steps: throttle opening degree-target engine speed-nominal engine torque-necessary clutch transmission torque-conversion of clutch pressure as shown in FIG. 8, FIG. 7 (a characteristic diagram showing a relation of clutch oil pressure to clutch transmission torque and FIG. 9 (characteristic diagram showing a relation of throttle opening degree to feed forward quantity).

In the above-mentioned conventional belt-driven type speed changing machine, the following disadvantage is found. The characteristics of an engine change due to conditions of use, environment, and a change of the structural elements with time, non-uniformity of the elements. Further, the output of an engine changes depending on conditions of operation of accessories and an electric load. Further, there are a change and scattering of clutch oil pressure/transmission torque characteristics as shown in FIG. 7. When an error in a feed forward quantity (a temporary target clutch pressure) becomes large due to the causes as described above, a correcting value obtained by the feed back loop is insufficient (there is a limit in the correcting value since there is an upper limit in a control gain of the feed back loop rather than the stability of the feed back loop), and there causes a time lag. Accordingly, the revolution of an engine tends to blow up due to a delay in clutch coupling, or a shock of clutch coupling is resulted because the clutch coupling is too fast, whereby a driver feels uneasy feeding of the engine. In the worst case, the engine is stopped.

SUMMARY OF THE INVENTION

It is an object of the present invention to provide a control apparatus for an automatic clutch which eliminates non-uniformity in various characteristics, a deviation of feed forward quantity caused by fluctuations and facilitates, easy control, without impairing advantages of feed forward control, avoiding a delay in control and hunting.

The foregoing and other objects of the present invention have been attained by providing a control apparatus for an automatic clutch device which comprises a primary pressure controlling valve for controlling a primary pressure in an oil clutch, a line pressure controlling valve for controlling a line pressure in the oil clutch, a clutch pressure controlling valve for controlling a clutch pressure in the oil clutch, first, second and third electromagnetic valves for controlling respectively the primary pressure controlling valve, the line pressure controlling valve and the clutch pressure controlling valve, and a control section which controls the first, second and third electromagnetic valves and effects a feed-back control of engine speed to the third electromagnetic valve, and which stores values obtained by the learning of feed-back quantities of the engine speed until the last time and changes a clutch pressure control duty to the third electromagnetic valve by modifying a feed forward quantity with the value by learning.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIGS. 2(a)-2(d) are diagrams for explaining the above-mentioned embodiment, which shows data at starting in a case that a feed forward quantity is within an appropriate range;

FIGS. 3(a)-3(d) are diagrams for explaining the above-mentioned embodiment and for showing an example of data at starting in a case that the feed forward quantity becomes too large;

FIG. 4 is a block diagram showing a belt-driven type continuous speed changing machine in a conventional control apparatus for an automatic clutch;

FIG. 9 is a characteristic diagram for explaining the feed back system and feed forward system as in FIG. 5 and for showing a relation of throttle opening degree to feed forward quantity.

DETAILED DESCRIPTION OF PREFERRED EMBODIMENT

Figure 1:
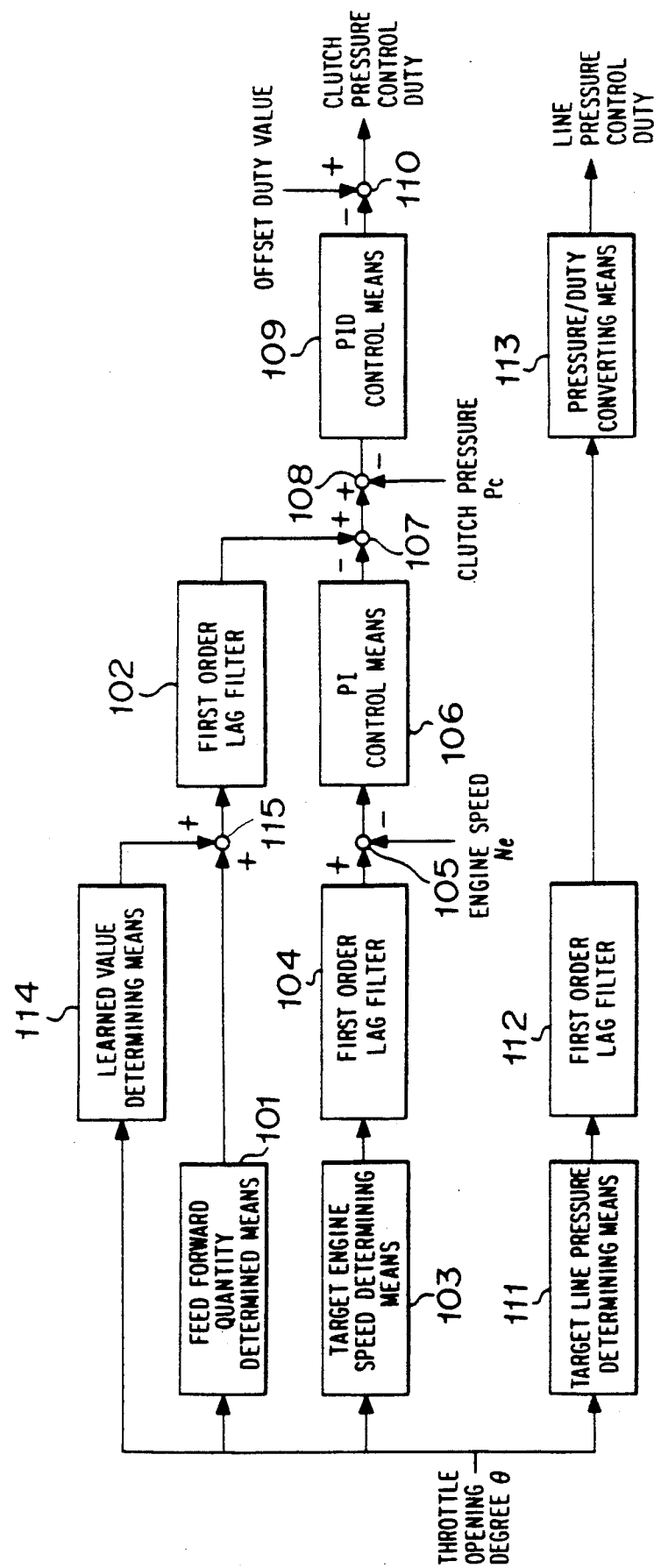
FIG. 1 is a block diagram of an embodiment of a control section having a feed back system and feed forward system, which is used for the control apparatus for an automatic clutch according to the present invention.

Referring to the drawings, wherein the same reference numerals designate the same or corresponding parts throughout the several views, and more particularly to FIG. 1, there is shown a block diagram of a feed back system and a feed forward system in a control section used for the control apparatus for an automatic clutch of the present invention.

Figure 5:
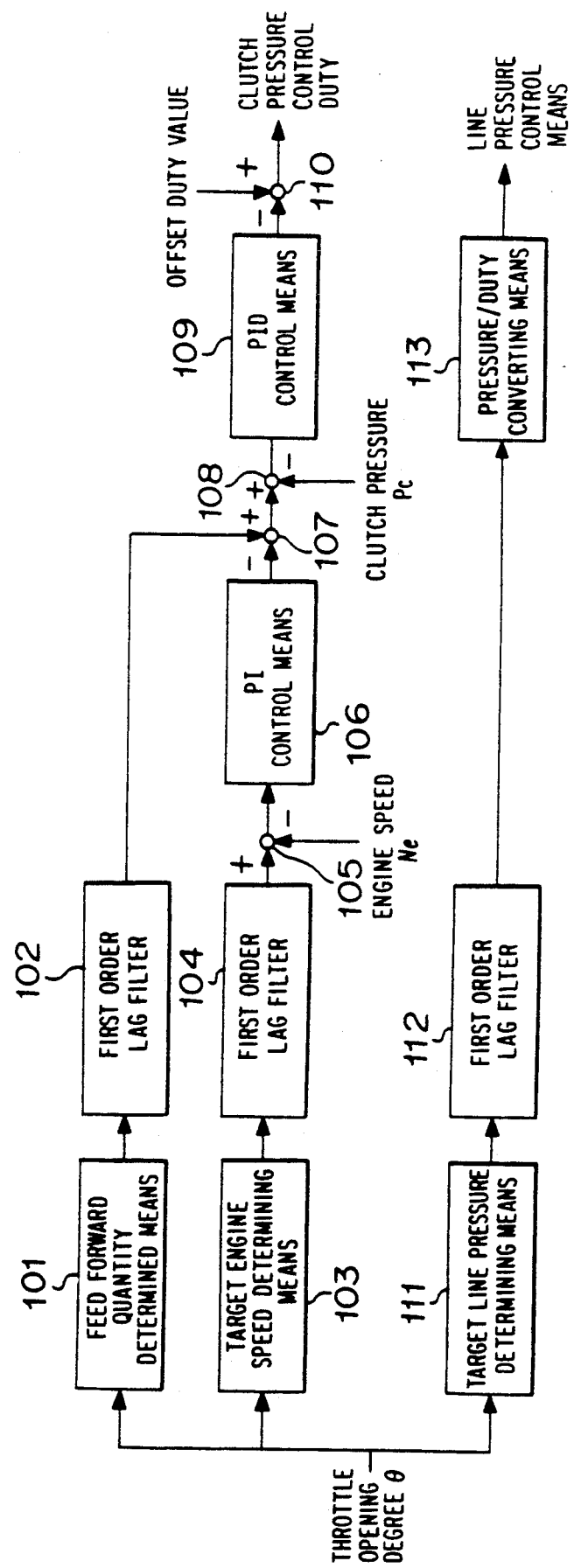
FIG. 5 is a block diagram of a control section having a feed back system and a feed forward system, which is used for the belt-driven type continuous speed changing machine as shown in FIG. 4.
Figure 6:
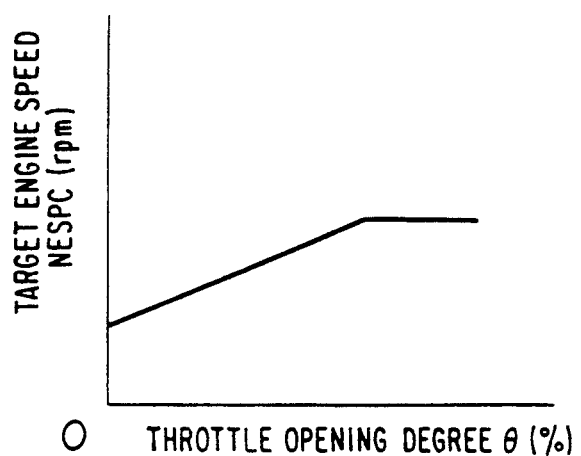
FIG. 6 is a characteristic diagram for explaining the feed back system and the feed forward system as in FIG. 5 and showing a relation of throttle opening degree to target engine speed.
Figure 7:
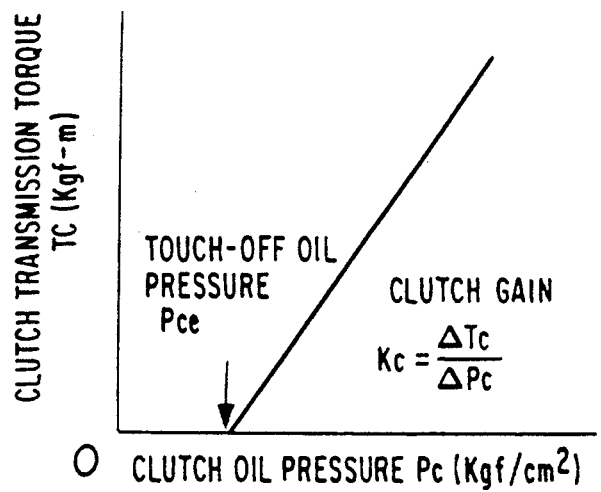
FIG. 7 is a characteristic diagram for explaining the feed back system and the feed forward system as in FIG. 5 and for showing a relation of clutch oil pressure to clutch transmission torque.
Figure 8:
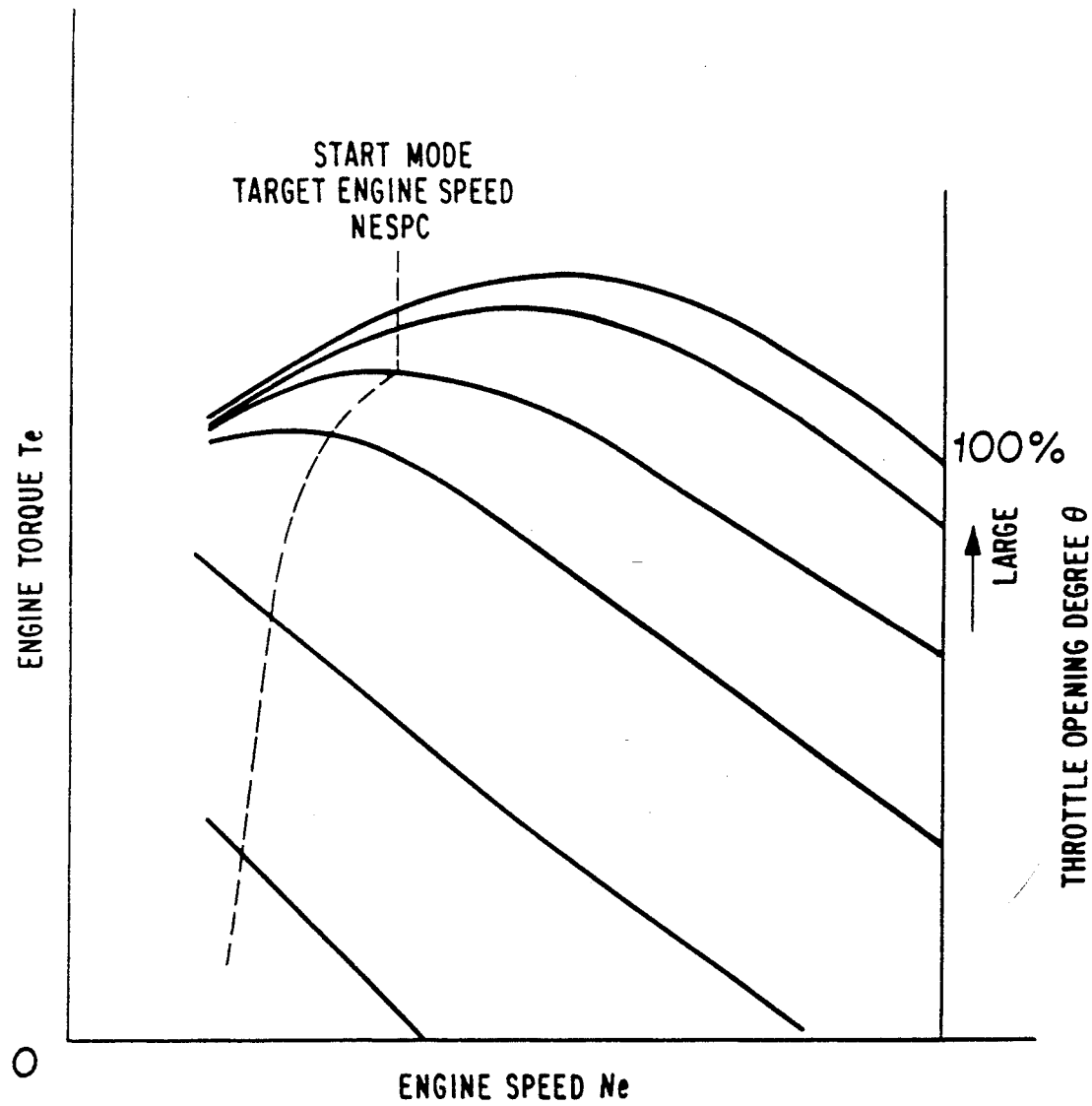
FIG. 8 is a characteristic diagram for explaining the feed back system and the feed forward system as in FIG. 5 and for showing a relation of engine speed to engine torque.

The characteristic feature of the embodiment as shown in FIG. 1 is that an adder 115 and a learned value determining means 114 are provided in addition to the construction as in FIG. 5. The learned value determining means 115 stores values or data obtained by learning of feed-back quantities on engine speed until the last time, which are classified for each throttle opening degree. The learned values are to be outputted to the adder 115.

The adder 115 adds the output of the learned value determining means 114 and the output of the feed forward quantity determining means 101, and a value obtained by the adding operations is outputted to the first order lag filter 102. The other construction is the same as that of the FIG. 5.

In the construction of the control section of the present invention, the learned value determining means 114 obtains the feed back quantities of engine speed in a time from the start of control to the time after a predetermined time for each throttle opening degree $\theta$, and stores the values thus obtained by learning.

FIGS. 2 and 3 show how the learned value is obtained. Namely, a pressure correcting value outputted from the PI control means 106 in a learning time is taken as a learned value corresponding to each of the throttle opening degrees at the learning time, and a weighted average value is obtained between the latest learned value and the learned values obtained until the last time, and the weighted average value is used as a newly learned value. Namely, the learned value obtained by the last time is supplied to the adder 115, at which the learned value is added to the feed forward quantity. A resulted value is subjected to a filter treatment in the first order lag filter 102. Then, the output of the first order lag filter 102 is supplied to the subtractor 107 in which an error is obtained between the output of the first order lag filter 102 and the output of the PI control means 106. The error value is a correcting value of the feed forward quantity at this time.

FIG. 2 shows an example of data at starting in a case that the feed forward quantity is within an appropriate range, wherein FIG. 2a shows a relation of throttle opening degree to time, FIG. 2b shows a relation of clutch pressure to time, FIG. 2c shows a relation of engine speed to time and FIG. 2d shows a relation of car speed to time.

FIG. 3 is a diagram showing an example of data at starting in a case that the feed forward quantity becomes excessive by any cause wherein FIG. 3a shows a relation of throttle opening degree to time, FIG. 3b is of clutch pressure to time, FIG. 3c is of engine speed to time and FIG. 3d is of car speed to time.

As an alternative method of obtaining a learned value, a value of an integration element in the PI control means 106 may be used instead of the pressure throttle opening degree.

Further, although the above-mentioned learning time is a predetermined time after the start mode has started, it may be determined as such a time when the error between the target engine speed and an actual engine speed is within a predetermined value.

Further, the data of the learned value may be obtained not only at a single time in a start mode, but also at several times in the start mode.

As the condition of obtaining the learned value, an oil temperature condition may be added to the condition of throttle opening degree.

Further, in the above-mentioned embodiment, the feed back quantity at the last time is used as the learned value. However, a proportion of the feed back quantity at the last time/the feed forward quantity may be used as the learned value. In this case, a multiplier is used instead of the adder 115.

It is only sufficient that the PID control means 109 and the PI control means 106 in FIG. 1 suitably perform feed back control respectively. However, they are not essential elements to the present invention.

Thus, in accordance with the present invention, a result of a feed back control is obtained as a learned value, and a feed forward quantity is corrected with the learned value. Accordingly, a deviation of the feed forward quantity due to changes and scattering in various characteristics can be eliminated without impairing the advantages of the feed forward control which avoids a delay of control and hunting, and control of high quality can be obtainable in a simple and economical manner.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for an automatic clutch device comprising:

a primary pressure controlling valve for controlling a primary pressure in an oil clutch, a line pressure controlling valve for controlling a line pressure in the oil clutch, a clutch pressure controlilng valve for controlling a clutch pressure in the oil clutch, first, second and third electromagnetic valves for controlling respectively the primary pressure controlling valve, the line pressure controlling valve and the clutch pressure controlling valve, engine speed sensing means for sensing a speed of said engine, and a control section which is coupled to and which controls the first, second and third electromagnetic valves, wherein said control section includes means for performing a feed-back control of said engine speed to the third electromagnetic valve, means for learning feed-back quantities of said engine speed, means for modifying a feed-forward quantity, means for storing values representing engine speed obtained by learning feed-back quantities of the engine speed and means for changing a clutch pressure control duty of the third electromagnetic valve by modifying said feed-forward quantity by the last value learned.

2. The control apparatus for an automatic clutch device according to claim 1, further comprising a feed-forward quantity determining means for determining a feed-forward quantity, wherein the control section further includes a learned value determining means for determining the values obtained by the learning of feed-back quantities of engine speed, and an adder to sum the output of the learned value determining means and the output of said feed-forward quantity determining means.

3. The control apparatus for an automatic clutch device according to claim 2, further comprising a first order lag filter means for processing the output of the adder by a first order lag function.

* * * * *